United States Patent
Gao et al.

(10) Patent No.: US 7,565,310 B2
(45) Date of Patent: Jul. 21, 2009

(54) METHOD AND SYSTEM AND PROGRAM PRODUCT FOR A DESIGN PATTERN FOR AUTOMATING SERVICE PROVISIONING

(75) Inventors: Jingrong Gao, Richmond Hill (CA); Michael George Polan, Markham (CA); Alex Kwok Kee Tsui, Markham (CA)

(73) Assignee: International Business Machines Corporation, Armonk, NY (US)

( * ) Notice: Subject to any disclaimer, the term of this patent is extended or adjusted under 35 U.S.C. 154(b) by 799 days.

(21) Appl. No.: 11/121,421

(22) Filed: May 4, 2005

(65) Prior Publication Data

US 2006/0271928 A1    Nov. 30, 2006

(51) Int. Cl.
G06F 17/30 (2006.01)

(52) U.S. Cl. .......... 705/27; 705/26; 709/226; 709/229; 718/104; 370/252

(58) Field of Classification Search .......... 705/26, 705/27
See application file for complete search history.

(56) References Cited

U.S. PATENT DOCUMENTS

| | | | | |
|---|---|---|---|---|
| 5,889,956 | A * | 3/1999 | Hauser et al. | 709/226 |
| 6,003,061 | A * | 12/1999 | Jones et al. | 718/104 |
| 2002/0174227 | A1 | 11/2002 | Hartsell et al. | 709/226 |
| 2002/0194045 | A1* | 12/2002 | Shay et al. | 705/8 |
| 2003/0028656 | A1* | 2/2003 | Babka | 709/229 |
| 2003/0084156 | A1* | 5/2003 | Graupner et al. | 709/226 |
| 2004/0006498 | A1* | 1/2004 | Ohtake et al. | 705/5 |
| 2004/0010437 | A1 | 1/2004 | Kiran et al. | 705/8 |
| 2004/0059621 | A1 | 3/2004 | Jameson | 705/8 |
| 2004/0128176 | A1 | 7/2004 | Jordan et al. | 705/8 |
| 2004/0153533 | A1 | 8/2004 | Lewis | 709/223 |
| 2004/0162749 | A1 | 8/2004 | Vogel et al. | 705/8 |
| 2004/0205206 | A1 | 10/2004 | Naik et al. | 709/230 |
| 2004/0267897 | A1 | 12/2004 | Hill et al. | 709/217 |
| 2005/0027577 | A1 | 2/2005 | Saeed | 705/8 |
| 2005/0027785 | A1* | 2/2005 | Bozak et al. | 709/200 |

OTHER PUBLICATIONS

Gao et al., Method and Apparatus for Determining Data Center Resource Availability Using Multiple Time Domain Segments, May 4, 2005.
U.S. Appl. No. 10/870,227, Oprea et al., Method and System for Establishing a Deployment Plan for an Application, Jun. 17, 2004.
U.S. Appl. No. 10/870,228, Oprea et al., Method and System for Managing Application Deployment, Jun. 17, 2004.

* cited by examiner

*Primary Examiner*—Mark Fadok
(74) *Attorney, Agent, or Firm*—Yee & Associates, P.C.; Jeffrey S. LaBaw

(57) ABSTRACT

A method, an apparatus, and computer instructions are provided for a design pattern for automating service provisioning. Embodiments of the invention provide a catalog item management system that comprises a set of service and catalog item management functions that manage lifecycles of services and catalog items. Embodiments of the invention also provide an order fulfillment system that comprises a set of order, subscription, and service instance functions for managing orders, subscriptions, and service instances in order to provision and deprovision an application. In addition, embodiments of the invention provide a calendar reservation and scheduling system that presents a list of resource availabilities using an algorithm. Furthermore, embodiments of the invention provide a provisioning process that includes a process order method that initiates reservation of resources, provisioning, deprovisioning, and modification of services based on an order type.

3 Claims, 3 Drawing Sheets

METHOD AND SYSTEM AND PROGRAM PRODUCT FOR A DESIGN PATTERN FOR AUTOMATING SERVICE PROVISIONING

CROSS-REFERENCE TO RELATED APPLICATIONS

Embodiments of the invention is related to the following applications entitled Method and Apparatus for Determining Data Center Resource Availability using Multiple Time Domain Segments, Ser. No. 11/121,533, filed on May 4, 2005; Method and System for Managing Application Deployment, Ser. No. 10/870,228, filed on Jun. 17, 2004; Method and System for Establishing a Deployment Plan for an Application, Ser. No. 10/870,227, filed on Jun. 17, 2004. All of the above related applications are assigned to the same assignee, and incorporated herein by reference.

BACKGROUND OF THE INVENTION

1. Technical Field

Embodiments of the invention relate to a data processing system. In particular, embodiments of the invention relate to provisioning services in a data center. Still more particularly, embodiments of the invention relate to providing a design pattern for automating service provisioning in a data center.

2. Description of Related Art

In a data center, an application deployment template may be used to represent multi-tiered applications or service and deploy applications. As described in related patent application entitled "Method and System for Managing Application Deployment", which is incorporated by reference above, a deployment plan may be developed containing an outline of resources and configurations used for deployment based on resource dependency characterization of the applications to enable deployment, logical characterization and network characterization of desired deployment.

In particular, as described in related patent application entitled "Method and System for Establishing a Deployment Plan for an Application", which is incorporated by reference above, a deployment plan describes dependencies between an application's elements and physical and networking components of a deployment. The deployment plan also provides a framework of steps for realizing application deployment within a system for managing deployment of an application. The deployment plan may be established by a user provided logical application structure for an application to be deployed and a chosen application deployment template comprising logical deployment template and network topology template. The logical deployment template defines nodes for supporting deployment and the network topology template defines configuration elements for resolving dependencies between nodes.

While application deployment template is one of the mechanisms that can be used for automated provisioning of services, the availability of resources needs to be considered when building a deployment plan and before using the template to automate deployment. Currently, users have to manually verify that resources are available before provisioning of service is initiated. Thus, administrators have to manually track resource availabilities. For example, an administrator has to make sure that storage space, networking, and servers are available for deployment of an application.

Since administrators are required to manually track resource availabilities, resources may be under utilized. In the process of provisioning services, administrators may not have noticed that other resources are available at a given time. Consequently, resources may not be reused when the application is un-deployed.

With current data center management solutions, automated service provisioning results in two failures. The first failure is that application delivery to data center consumers is not guaranteed at the needed time. Thus, administrators have to determine which application is deployed at what time. The second failure is that resources may be under utilized, since resource usage is tracked manually by the administrators. Therefore, it would be advantageous to have a design pattern for automating provisioning services, which provides on time application delivery and provides better management of resource usage.

SUMMARY OF THE INVENTION

Embodiments of the invention provide a method, an apparatus, and computer instructions for a design pattern for automating service provisioning. Responsive to a data center operator definition of a service, the service is added to a service catalog with a service start time and a service end time. A list of availabilities is then presented to a consumer by the catalog item management system for ordering of the service from the service catalog. Responsive to an order placed by the consumer, an ordering fulfillment system manages a subscription for the order, and automatically provisions an application based on the user defined service start time. Alternatively, the order fulfillment system automatically deprovisions the application responsive to encountering the user defined service end time or modifies an order responsive a user defined modification.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
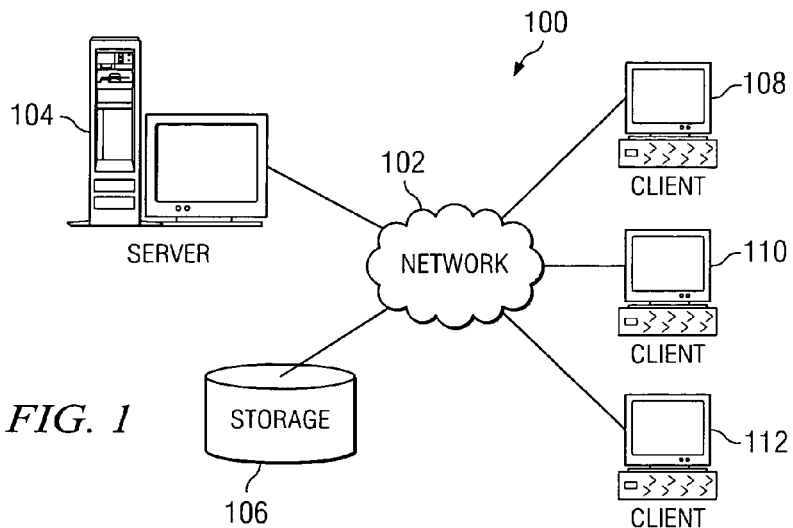
FIG. 1 depicts a pictorial representation of a network of data processing systems in which an embodiment of the invention may be implemented.

With reference now to the figures, FIG. 1 depicts a pictorial representation of a network of data processing systems in which an embodiment of the invention may be implemented. Network data processing system 100 is a network of computers in which an embodiment of the invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for embodiments of the invention.

Figure 2:
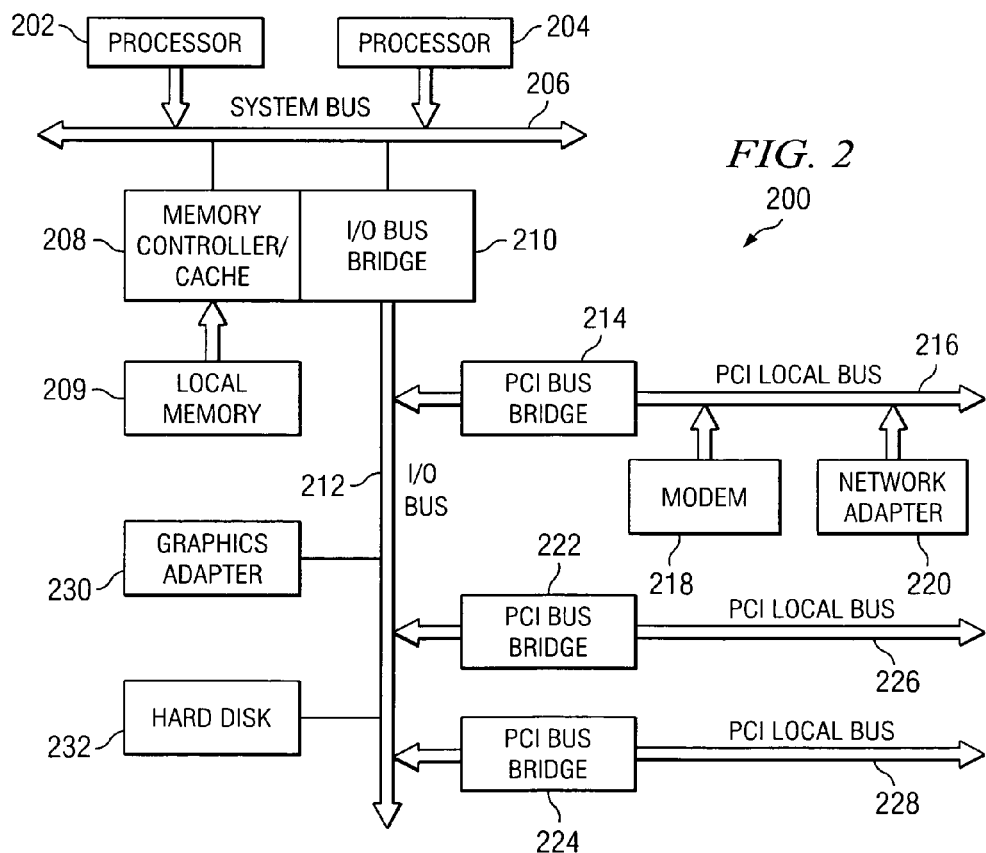
FIG. 2 is a block diagram of a data processing system that may be implemented as a server, in accordance with an illustrative embodiment of the invention.

Referring to FIG. 2, a block diagram of a data processing system that may be implemented as a server, such as server 104 in FIG. 1, is depicted in accordance with an illustrative embodiment of the invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the embodiments of the invention.

The data processing system depicted in FIG. 2 may be, for example, an IBM eServer pSeries® system, a product of International Business Machines Corporation in Armonk, N.Y., running the Advanced Interactive Executive (AIX®) operating system or the LINUX operating system.

Figure 3:
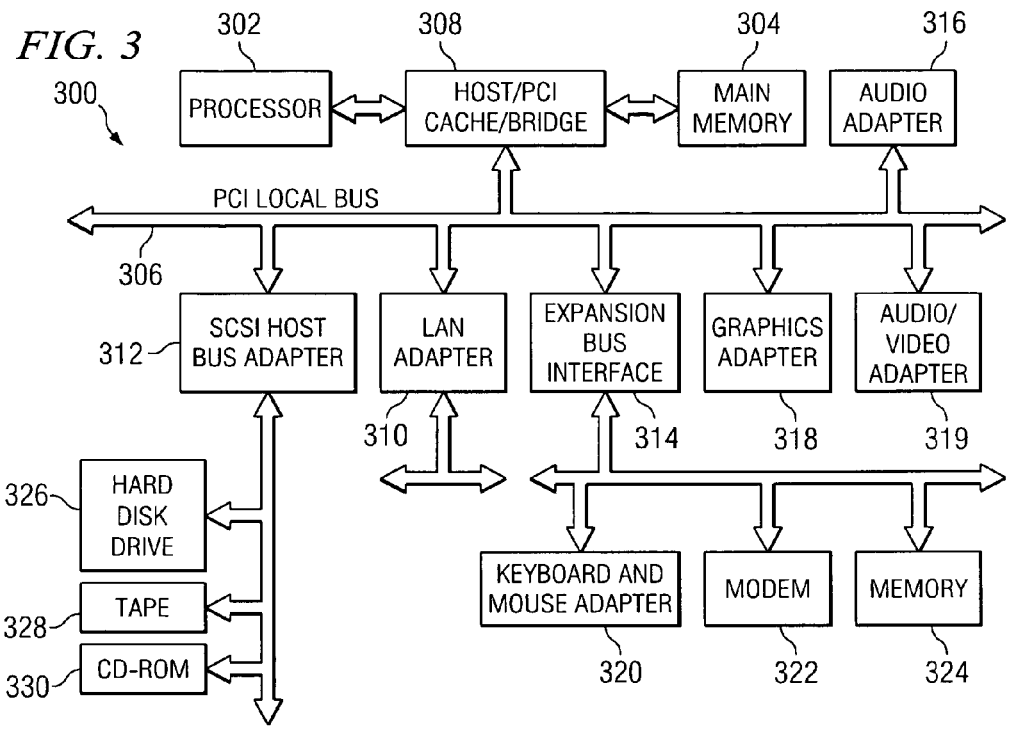
FIG. 3 is a block diagram of a data processing system in which an illustrative embodiment of the invention may be implemented.

With reference now to FIG. 3, a block diagram illustrating a data processing system is depicted in which an embodiment of the invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows® XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the embodiments of the invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
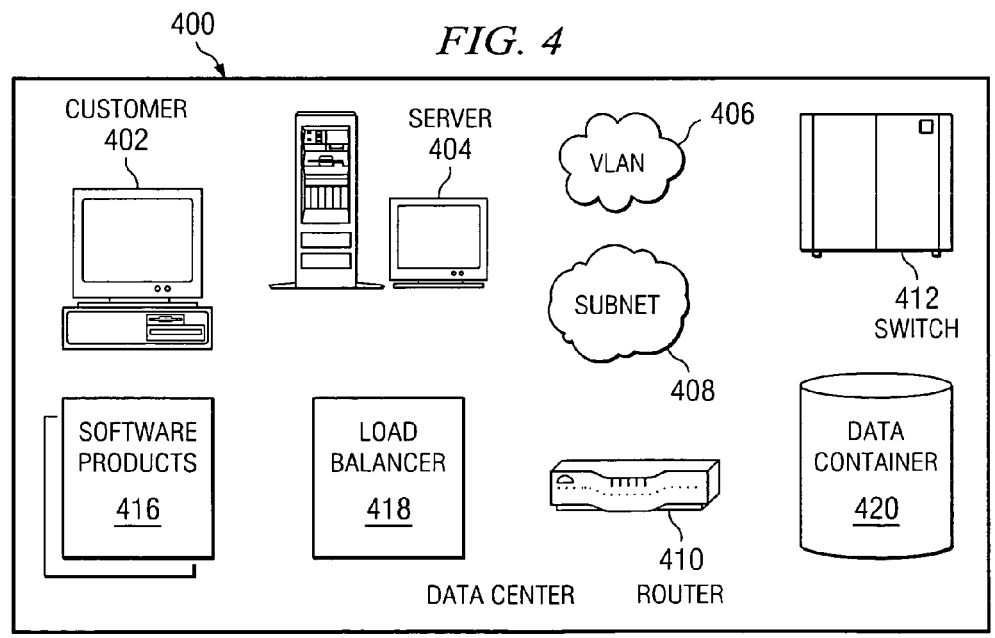
FIG. 4 is a diagram illustrating an exemplary data center, in accordance with an illustrative embodiment of the invention.

Turning now to FIG. 4, a diagram illustrating an exemplary data center is depicted in accordance with an illustrative embodiment of the invention. As shown in FIG. 4, in this illustrative example, data center 400 includes resources, such as, customer 402, server 404, Virtual Local Area Network (VLAN) 406, subnet 408, router 410, switch 412, software products 416, load balancer 418, and data container 420.

Customer 402 may be, for example, a client or an administrator who uses a data processing system, such as data processing system 300 in FIG. 3. Server 404 may be implemented as a data processing system, such as data processing system 200 in FIG. 2. Server 404 may also be implemented as an application server, which hosts Web services, or other types of servers. Router 410 and switch 412 facilitate communications between different devices. VLAN 406 is a network of computers that behave as if they are connected to the same wire even though they may actually be physically located on different segments of a local area network. Subnet 408 is a portion of a network, which may be a physically independent network segment and share a network address with other portions of the network.

Software products 416 are applications that may be deployed to a client or a server. Load balancer 418 spreads traffic among multiple systems such that no single system is overwhelmed. Load balancer 418 is normally implemented as software running on a data processing system. Data container 420 may be a database, such as DB2® Universal Database, a product available from International Business Machines Corporation.

Data center 400, as depicted in FIG. 4, is presented for purposes of illustrating the embodiments of the invention. Other resources, such as, for example, cluster of servers and switch ports, also may be included in data center 400. The mechanism of embodiments of the invention provides a design pattern for automating provisioning services in a data center, such as data center 400. The processes of the embodiments of the invention may be performed by a processing unit comprising one or more processors, such as processor 302 in FIG. 3, using computer implemented instructions, which may be located in a memory such as, for example, main memory 304, memory 324, or in one or more peripheral devices 326 and 330.

An illustrative embodiment of the invention provides a catalog and order fulfillment system that alleviates the problem of underutilization of resources and application deliveries. To alleviate underutilization of resources, the catalog and order fulfillment system represents an application deployment template as a service with a parameter called maximum allowed service instance count. The maximum allowed service instance count provides a threshold for the system to control the total number of deployed applications for an application deployment template, which ensures that at any time the resource usage is within the data center capacity.

In another illustrative embodiment, based on the order placed by a user in the service catalog, the catalog and order fulfillment system reserves the application for the user for a time period that satisfies the user's preference. In this way, resource availability is considered when placing an order for a service. In addition, the catalog and order fulfillment system automatically deploys the application at the reservation start time and undeploys the application at reservation end time to return resources to the pool.

Figure 5:
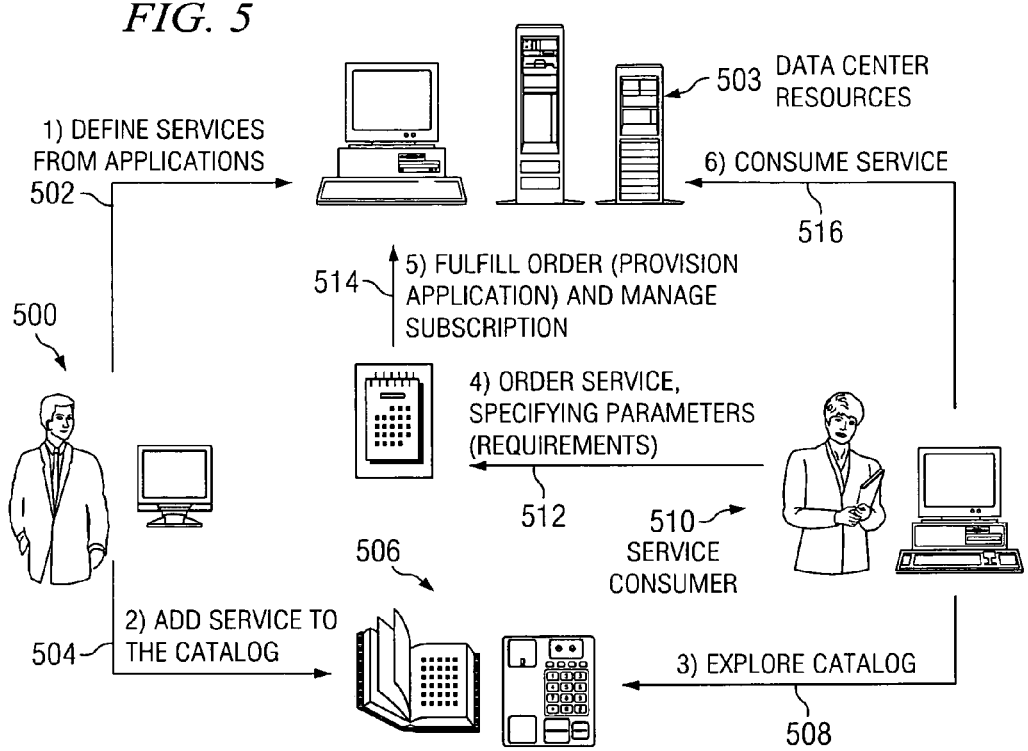
FIG. 5 is a diagram illustrating an application auto-provisioning process using catalog and order fulfillment in accordance with an illustrative embodiment of the invention.

Turning now to FIG. 5, a diagram illustrating an application auto-provisioning process using catalog and order fulfillment is depicted in accordance with an illustrative embodiment of the invention. As shown in FIG. 5, a data center administrator builds an application deployment plan template which describes what application to provision and deprovision. The template also describes what configuration settings are required for the applications to be deployed. These configuration settings include networks, servers, switches, and routers, etc.

Based on the application deployment plan, data center administrator 500 defines a service using the data center resources 503 to represent the deployment plan with information of how to deploy and undeploy the application 502. The service defines what operations are run to provision and deprovision the application. The service also provides service parameters, such as specific IP address to be used, specific name masks, etc. At this time, data center administrator 500 may define the maximum number of service instance counts for the service.

After the service is defined, data center administrator may add the service to service catalog 506 as a service catalog item 504. At this time, data center administrator 500 defines the service catalog item's available time period, which includes a start time and an end time. In addition, when the service is added to service catalog 506, data center provider may define business parameters to the item, for example, billing and service level agreement information.

Instead of defining a single service having only one catalog item, the same service may be defined with multiple catalog items. For example, a service may be defined to have a gold service catalog item for the fastest response time, a silver service catalog item for the faster response time, and a bronze service catalog item for the normal economical response time.

After items are added to the service catalog, a service consumer 510 may explore the catalog 508 to explore services that are available and select one or more catalog items that meet the consumer's needs. Once service consumer 510 selects the items, service consumer 510 places an order using an online ordering system. In turn, the ordering system presents a list of service available time slots and time slices within a time slot. Service consumer 510 then chooses a time period within the available time slots and specifies service parameters 512, such as the number of servers required, the service level agreement, etc.

After the order, which includes a provision start time, a provision end time, and a user requirement, is placed, the fulfillment system fulfills the order by creating a subscription that manages the order 514. The subscription schedules the application for deployment using information from the order and undeploys the application when provision end time is reached.

Once the order is fulfilled, the fulfillment system informs service consumer 510 when the service is available and provides necessary information to consume service 516 by accessing the application, for example, how to access the application via a URL, userid, and passwords, etc. Thus, with the order and fulfillment system provided by embodiments of the invention, services may be automatically provisioned and deprovisioned, such that resource availability is automatically tracked and resource usage is monitored.

In an illustrative embodiment, the order and fulfillment system includes four main components: a catalog item management system, an order fulfillment system, a calendar reservation and scheduling system, and a provisioning process. The catalog item management system provides functions to manage catalog items and services. Service management functions include service lifecycle management functions, such as creations, modifications, and deletion of services.

Catalog item management functions include creation, modification, deletion, publishing and un-publishing of catalog items.

In an illustrative embodiment, only published and "alive" catalog items are available for consumer to order. An "alive" catalog item is a catalog item that is available at the current time. For example, an item that starts from next year for 1 year. Published catalog items are catalog items that can be seen by the user.

Order fulfillment system provides management function to orders, subscriptions, and service instances. This system creates subscriptions, and service instances to automatically provision and deprovision the application. The order fulfillment system interacts with the calendar reservation and scheduling system to provide available time slots of a service during the ordering process to consumers, such that consumers may select the time slot or time slice to provision, deprovision, or modify the order. In addition, the order fulfillment system interacts with the provisioning process to deploy and undeploy the application.

The calendar reservation and scheduling system is aware of all active subscription start time and end time. Using an algorithm described in patent application entitled "Method and Apparatus for Determining Data Center Resource Availability using Multiple Time Domain Segments," which is incorporation by reference above, a list of resource availabilities is determined based on maximum number of service instances and all active reservations of the service. This algorithm checks the service catalog item's start and end times and determines, based on all "alive" reservations and the maximum number of service instances, what time slots are available for the service catalog item.

Figure 6:
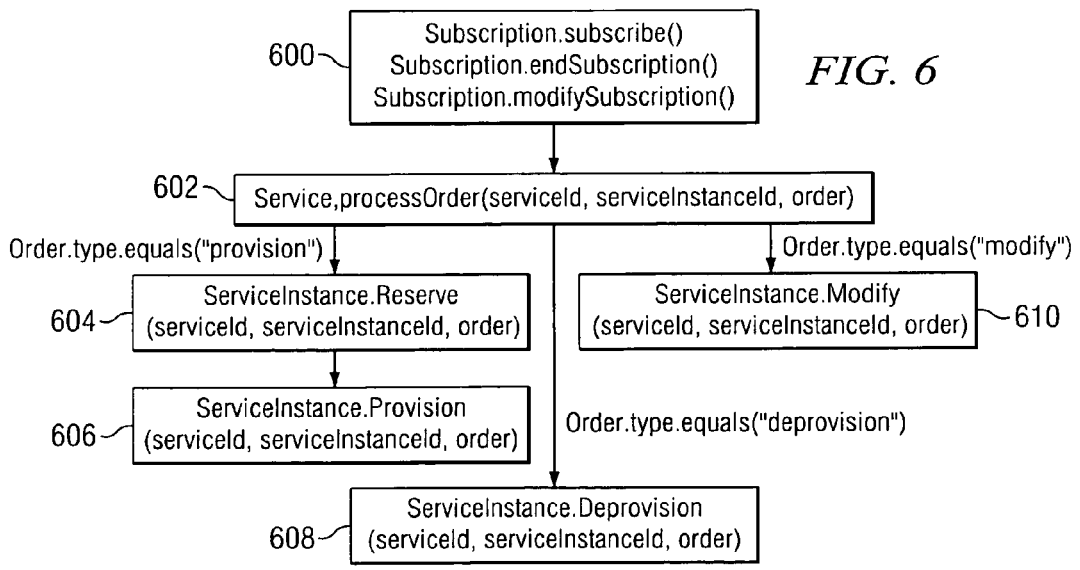
FIG. 6 is a diagram illustrating an exemplary provisioning process is depicted in accordance with an illustrative embodiment of the invention.

The provisioning process provides a method in a service class to process an order to provision and deprovision a service instance. Turning now to FIG. 6, a diagram illustrating an exemplary provisioning process is depicted in accordance with an illustrative embodiment of the invention. As shown in FIG. 6, in this exemplary implementation, a consumer creates a service instance by invoking subscribe method 600 in subscription class.

Subscribe method 600 reads the order to determine what the time the requested service starts and schedules processOrder method 602 in the service class at the service start time as an entry point to provision a service. ProcessOrder method 602 takes a service identifier, a service instance identifier and an order type as input parameters. When provisioning a service, the order type is "provision". When deprovisioning a service, the order type is "deprovision". When modifying a service, the order type is "modify".

If the order type is "provision", reserve method 604 is invoked on the created service instance. Reserve method 604 prepares the resources for provisioning. For example, reserve method 604 may locate the server, build a server into a cluster, etc.

After the resources are reserved, provision method 606 is invoked at subscription start time to provision the reserved resources to the consumer to satisfy the order. The subscription start time is the same time as the service start time within the order. Provision method 606 deploys the application to the consumer for use. Based on the resource type to be provisioned, user defined workflows may be plugged into provision method 606 to perform real resource provisioning. For example, a specific workflow may be plugged into logical operations to install and start DB2 in a server, and then notify a billing system for charging resource usage. The billing system may then create a billing account to track charges. Once provision method 606 finishes provisioning, a "deprovision" order is created and used to schedule deprovisioning of the resources. To deprovision the resources, processOrder 602 is invoked when subscription end time is reached, which in turn invokes deprovision method 608 to release resources back to the free pool. User defined workflows are plugged into the deprovision method to deprovision the resources. Alternatively, deprovision method 608 may be invoked directly via processOrder method 602 by a consumer to terminate a service. In this case, the order type of processOrder method 602 is "deprovision".

If the order type is "modify", modify method 610 is invoked on the service instance to perform necessary modifying operations on the service, for example, terminating the subscription before original end time of the service, or changing the original end time of a subscription to a new end time.

In summary, embodiments of the invention provide a design pattern for automating service provisioning to solve the problem of on time application delivery and resource under utilization. With embodiments of the invention, applications may be automatically provisioned using a catalog and ordering fulfillment system that manages service and catalog item lifecycles, determines a number of available time slots based on maximum number of service instances allowed, presents available time slots to user for ordering of services, and perform actual provisioning, deprovisioning, and modification of service instances. In this way, resources usage is better managed and applications are deployed more efficiently.

It is important to note that while embodiments of the invention have been described in the context of a fully functioning data processing system, those of ordinary skill in the art will appreciate that the processes of embodiments of the invention are capable of being distributed in the form of a computer usable medium of instructions and a variety of forms and that the embodiments of the invention apply equally regardless of the particular type of signal bearing media actually used to carry out the distribution. Examples of computer usable media include recordable-type media such a floppy disc, a hard disk drive, a RAM, and CD-ROMs and transmission-type media such as digital and analog communications links.

The description of embodiments of the invention has been presented for purposes of illustration and description, but is not intended to be exhaustive or limited to the invention in the form disclosed. Many modifications and variations will be apparent to those of ordinary skill in the art. Embodiments were chosen and described in order to best explain the principles of the invention, the practical application, and to enable others of ordinary skill in the art to understand the invention for various embodiments with various modifications as are suited to the particular use contemplated.

What is claimed is:

1. A computer implemented method executed by a processor in a data processing system for a design pattern for automating service provisioning, the computer implemented method comprising:

defining at least one service using a set of service functions and a set of catalog item management functions provided by a catalog item management system, wherein defining the at least one service includes defining a maximum number of service instances allowed for the at least one service, and wherein the set of service and catalog item management functions includes at least one of creation of service, modification of service, deletion of services, creation of catalog items, modification of catalog items, deletion of catalog items, publishing of catalog items, and un-publishing of catalog items;

responsive to defining the at least one service, adding the at least one service to a service catalog with a service start time and a service end time using the set of service functions and the set of catalog item management functions provided by the catalog item management system;

presenting a list of availabilities to a consumer for ordering of the at least one service from the service catalog, wherein the list of availabilities is determined using a calendar reservation and scheduling system comprising an algorithm that determines the list of availabilities based on a user defined service start time, and a user defined service end time, all currently available reservations, and the maximum number of service instances allowed for the at least one service, wherein the at least one service is a published and currently available catalog item;

receiving an order placed by the consumer, wherein the order includes the user defined service start time, the user defined service end time, and user defined requirements;

responsive to receiving the order placed by the consumer, managing a subscription for the order using an ordering fulfillment system comprising a set of order functions, subscription functions, and service instance functions, wherein the subscription functions include a subscribe method for managing the subscription for the order, wherein the order functions include a process order method comprising an order type, and wherein the order type includes one of a provision order type, a deprovision order type, and a modify order type;

responsive to invoking the subscribe method, invoking the process order method with the provision order type;

responsive to invoking the process order method with the provision order type, invoking a reserve method to reserve resources, wherein user defined workflows are plugged into the reserve method to perform reservations, and invoking a provision method to automatically provision an application based on the user defined service start time, wherein the user defined workflows are plugged into the provision method to deploy the application and associated resources;

responsive to invoking the process order method with the deprovision order type, invoking a deprovision method to automatically deprovision the application based on the user defined service end time, wherein the user defined workflows are plugged into the deprovision method to undeploy the application and the associated resources; and responsive to invoking the process order method with the modify order type, invoking a modify method to perform modifying operations, wherein the modifying operations comprise terminating the at least one service before the service end time, and modifying the user defined service end time to a new end time; wherein the algorithm combines adjacent reservation entries by determining that an end time of the new reservation entry in the list of resource availabilities is equal to a start time of a next reservation entry in the list of resource availabilities, creating a combined reservation entry as a combined duration of the new reservation entry and the next reservation entry in the list of resource availabilities; removing from the list of resource availabilities reservation entries having shorter combined durations than a duration of a query to form a final list of resource availabilities.

2. A data processing system for a design pattern for automating service provisioning, the data processing system comprising:

a bus;

a memory connected to the bus, wherein a set of instructions are located in the memory; and a processing unit connected to the bus, wherein the processing unit executes the set of instructions to define at least one service using a set of service functions and a set of catalog item management functions provided by a catalog item management system, wherein defining the at least one service includes defining a maximum number of service instances allowed for the at least one service, and wherein the set of service and catalog item management functions includes at least one of creation of service, modification of service, deletion of services, creation of catalog items, modification of catalog items, deletion of catalog items, publishing of catalog items, and un-publishing of catalog items;

responsive to defining the at least one service, add the at least one service to a service catalog with a service start time and a service end time using the set of service functions and the set of catalog item management functions provided by the catalog item management system;

present a list of availabilities to a consumer for ordering of the at least one service from the service catalog, wherein the list of availabilities is determined using a calendar reservation and scheduling system comprising an algorithm that determines the list of availabilities based on a user defined service start time, a user defined service end time, all currently available reservations, and the maximum number of service instances allowed for the at least one service, wherein the at least one service is a published and currently available catalog item;

receive an order placed by the consumer, wherein the order includes the user defined service start time, the user defined service end time, and user defined requirements;

responsive to receiving the order placed by the consumer, manage a subscription for the order using an ordering fulfillment system comprising a set of order functions, subscription functions, and service instance functions, wherein the subscription functions include a subscribe method for managing the subscription for the order, wherein the order functions include a process order method comprising an order type, and wherein the order type includes one of a provision order type, a deprovision order type, and a modify order type;

responsive to an invocation of the subscribe method, invoke the process order method with the provision order type;

responsive to invoking the process order method with the provision order type, invoke a reserve method to reserve resources, wherein user defined workflows are plugged into the reserve method to perform reservations, and invoke a provision method to automatically provision an application based on the user defined service start time, wherein the user defined workflows are plugged into the provision method to deploy the application and associated resources;

responsive to invoking the process order method with the deprovision order type, invoke a deprovision method to automatically deprovision the application based on the user defined service end time, wherein the user defined workflows are plugged into the deprovision method to undeploy the application and the associated resources;

responsive to an invocation of the process order method with the modify order type, invoke a modify method to perform modifying operations, wherein the modifying operations comprise terminating the at least one service before the service end time, and modifying the user defined service end time to a new end time; wherein the algorithm combines adjacent reservation entries by determining that an end time of the new reservation entry in the list of resource availabilities is equal to a start time of a next reservation entry in the list of resource availabilities, creating a combined reservation entry as a combined duration of the new reservation entry and the next reservation entry in the list of resource availabilities; removing from the list of resource availabilities reservation entries having shorter combined durations than a duration of a query to form a final list of resource availabilities.

3. A computer program product comprising computer executable instructions embodied in a computer usable medium for a design pattern for automating service provisioning, the computer program product comprising:

first instructions for defining at least one service using a set of service functions and a set of catalog item management functions provided by a catalog item management system, wherein defining the at least one service includes defining a maximum number of service instances allowed for the at least one service, and wherein the set of service and catalog item management functions includes at least one of creation of service, modification of service, deletion of services, creation of catalog items, modification of catalog items, deletion of catalog items, publishing of catalog items, and un-publishing of catalog items;

second instructions for responsive to defining the at least one service, adding the at least one service to a service catalog with a service start time and a service end time using the set of service functions and the set of catalog item management functions provided by the catalog item management system;

third instructions for presenting a list of availabilities to a consumer for ordering of the at least one service from the service catalog, wherein the list of availabilities is determined using a calendar reservation and scheduling system comprising an algorithm that determines the list of availabilities based on a user defined service start time and a user defined service end time, all currently available reservations, and the maximum number of service instances allowed for the at least one service, wherein the at least one service is a published and currently available catalog item;

fourth instructions for receiving an order placed by the consumer, wherein the order includes the user defined service start time, the user defined service end time, and user defined requirements;

fifth instructions for responsive to the order placed by the consumer, managing a subscription for the order using an ordering fulfillment system comprising a set of order functions, subscription functions, and service instance functions, wherein the subscription functions include a subscribe method for managing the subscription for the order, wherein the order functions include a process order method comprising an order type, and wherein the order type includes one of a provision order type, a deprovision order type, and a modify order type;

sixth instructions for responsive to invoking the subscribe method, invoking the process order method with the provision order type;

seventh instructions for responsive to invoking the process order method with the provision order type, invoking a reserve method to reserve resources, wherein user defined workflows are plugged into the reserve method to perform reservations, and invoking a provision method to automatically provision an application based on the user defined service start time, and wherein the user defined workflows are plugged into the provision method to deploy the application and associated resources;

eighth instructions for responsive to invoking the process order method with the deprovision order type, invoking a deprovision method to automatically deprovision the application based on the user defined service end time, and wherein the user defined workflows are plugged into the deprovision method to undeploy the application and the associated resources; and ninth instructions for responsive to invoking the process order method with the modify order type, invoking a modify method to perform modifying operations, wherein the modifying operations comprise terminating the at least one service before the service end time, and modifying the user defined service end time to a new end time; wherein the algorithm combines adjacent reservation entries by determining that an end time of the new reservation entry in the list of resource availabilities is equal to a start time of a next reservation entry in the list of resource availabilities, creating a combined reservation entry as a combined duration of the new reservation entry and the next reservation entry in the list of resource availabilities; removing from the list of resource availabilities reservation entries having shorter combined durations than a duration of a query to form a final list of resource availabilities.

* * * * *